(12) United States Patent
VanSkiver et al.

(10) Patent No.: US 7,021,680 B2
(45) Date of Patent: Apr. 4, 2006

(54) LATCH MECHANISM FOR HOODED LITTER PAN

(75) Inventors: Ralph VanSkiver, Mansfield, TX (US); Mike Harper, Fort Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 133 days.

(21) Appl. No.: 10/801,810

(22) Filed: Mar. 16, 2004

(65) Prior Publication Data

US 2005/0206170 A1    Sep. 22, 2005

(51) Int. Cl.
*E05C 19/06* (2006.01)
(52) U.S. Cl. .................... 292/87; 119/165; 220/326
(58) Field of Classification Search ............... 292/80, 292/87, 91, 303, DIG. 11; 119/165; 220/326
See application file for complete search history.

(56) References Cited

U.S. PATENT DOCUMENTS

| 2,744,650 | A | 5/1956 | Woessner |
| 3,831,557 | A | 8/1974 | Elesh |
| 4,111,157 | A | 9/1978 | Haugen |
| 4,383,638 | A | 5/1983 | Bixler |
| 4,523,692 | A | * 6/1985 | Lemkin ....................... 220/788 |
| D300,966 | S | 5/1989 | Conner |
| D300,968 | S | 5/1989 | Conner |
| 5,427,265 | A | * 6/1995 | Cautereels et al. ......... 220/318 |
| 5,462,015 | A | 10/1995 | Murphy |
| 5,572,950 | A | 11/1996 | O'Rourke et al. |
| 5,806,461 | A | 9/1998 | Kiera |
| 6,189,490 | B1 | 2/2001 | Jempolsky |
| 6,571,740 | B1 | 6/2003 | Kinder |

FOREIGN PATENT DOCUMENTS

FR        2031628 A    11/1970

* cited by examiner

*Primary Examiner*—Gary Estremsky
(74) *Attorney, Agent, or Firm*—Locke Liddell & Sapp LLP

(57) ABSTRACT

A latch operable between a locked position and an unlocked position for securing a hood to a litter pan includes a rim adapted to be disposed on the hood. The hood rim includes a top wall and a sidewall. The top wall includes an aperture and the sidewall includes a rib. A rim is disposed on the pan and includes a top wall and a sidewall. The top wall includes a rib for insertion into the hood rim top wall aperture. When the latch secures the hood and pan in the locked position, the hood rim is disposed adjacent the pan rim such that the pan rim rib is disposed in the hood rim aperture and the hood rim rib engages the pan rim sidewall to prevent separation of the hood and pan.

9 Claims, 2 Drawing Sheets

LATCH MECHANISM FOR HOODED LITTER PAN

TECHNICAL FIELD OF THE INVENTION

The present invention relates to a liter box, and more particularly to a litter box including a pan and a detachable hood and having a latch to securely fasten the pan and hood together.

BACKGROUND OF THE INVENTION

Various litter box designs are available that include a pan and a detachable hood where the hood can be nested inside the pan when not in use, and in a use position, where the hood and pan form an enclosed area for use by a pet. However, in order to configure many of these litter boxes to the use position, tools are needed and/or additional components are required to securely fasten the members together, such as, for example, nuts, bolts, screws, rotating and/or pivotable latches, etc. In many instances, these additional components can become damaged or separated while the litter boxes are transported, stored, or after substantial use.

It its therefore desirable to provide a litter box having a latch with minimal pieces to securely fasten the litter box components together and without the use of tools.

SUMMARY OF THE INVENTION

In accordance with the present invention, a litter box is provided. The litter box includes a first member (a hood) and a second member (a litter pan) operable between a nested position, wherein the pan is nested inside the hood for storage, and a use position, wherein the hood is disposed over the pan forming an enclosure for a pet. While in the use position, a latch, which is integrally molded into the hood and pan components, is used to securely fasten the hood and pan together.

The hood includes a top wall, a front wall, a rear wall, a pair of sidewalls, and a bottom opening opposite the top wall. The front wall, the rear wall and the sidewalls include a hood rim disposed adjacent the bottom opening. The hood rim includes a top wall and a sidewall. The pan includes a bottom wall, a front wall, a rear wall, a pair of sidewalls and an upper opening opposite the bottom wall. The front wall, the rear wall and the sidewalls include a pan rim disposed adjacent the upper opening. The pan rim includes a top wall and a sidewall.

The pan rim top wall includes a rib extending therefrom and the hood rim top wall includes an aperture sized to receive the rib. In addition, the hood rim sidewall also includes a rib to engage the pan sidewall.

When the latch is in the locked position, the pan rim is disposed adjacent the hood rim, such that rib on the pan rim is placed inside the aperture on the hood rim. In addition, the rib on the hood sidewall engages said pan rim sidewall. While in this configuration, the pan rib prevents the hood rim from spreading apart from the pan rim. Furthermore, the pan sidewall rib prevents the hood from being detached from the pan.

In order to unlock the latch, the pet owner applies a slight force to the hood rim sidewall to separate the rib from the pan sidewall. When in this configuration, the hood can be separated from the pan.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
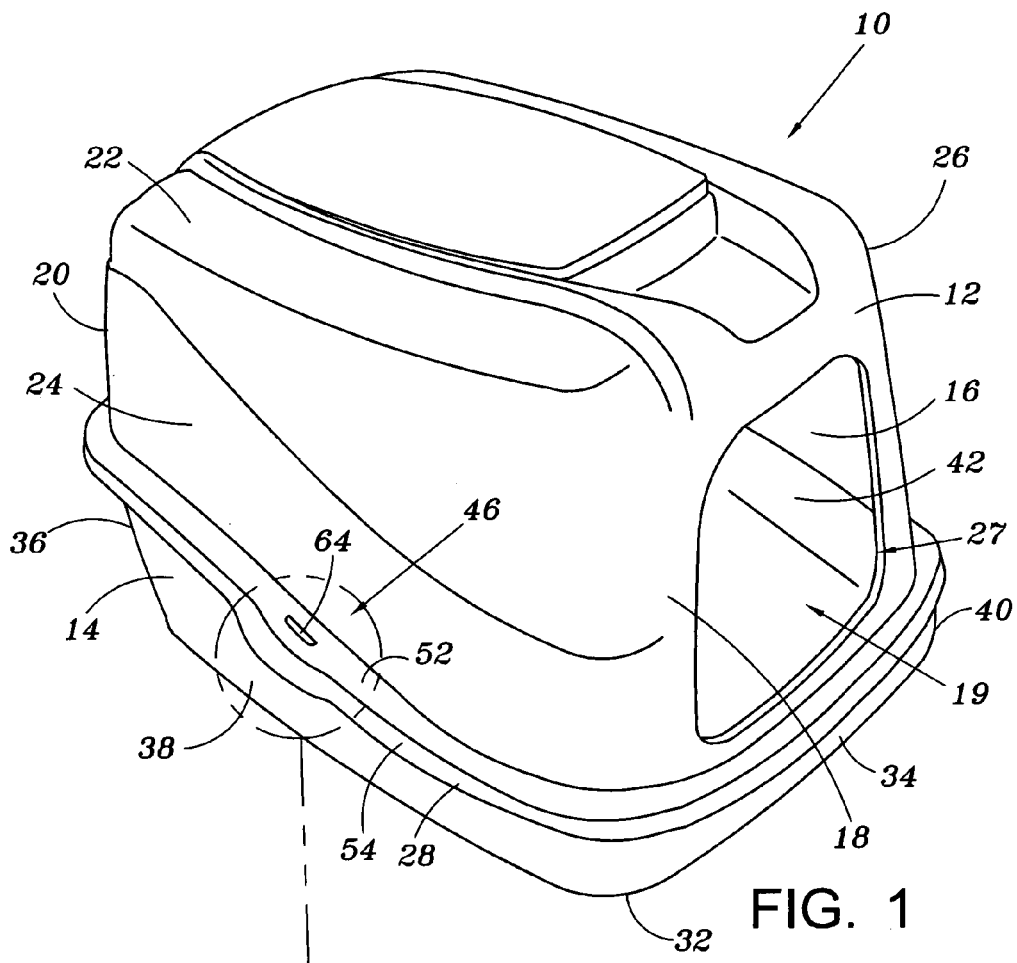
FIG. 1 is a front perspective view of a litter box illustrating the present latch.

As seen in FIG. 1, litter pan 10 includes a first member 12 disposed above a second member 14 to form an interior area 16 for housing a pet. First member 12 includes a front wall 18, a rear wall 20, a top wall 22 a pair of sidewalls 24 and 26 and a bottom opening 27 (FIGS. 1 and 3a) opposite top wall 26. A rim 28 is disposed adjacent bottom opening 27 and extends around the perimeter of opening 27. Front wall 18 includes an opening 19 allowing access into and out of interior area 16. Likewise, second member 14 includes a bottom wall 32, a front wall 34, a rear wall 36, a pair of sidewalls 38 and 40 and an upper opening 42 (FIGS. 1 and 3a) opposite bottom wall 32. Front wall 34, rear wall 36 and sidewalls 38 and 40 include a rim 44 (FIG. 3a) disposed adjacent upper opening 42 and extending around the perimeter thereof. In a preferred embodiment, first member 12 is a hood for a cat litter box and second member 14 is a pan to hold a supply of cat litter.

Figure 2:
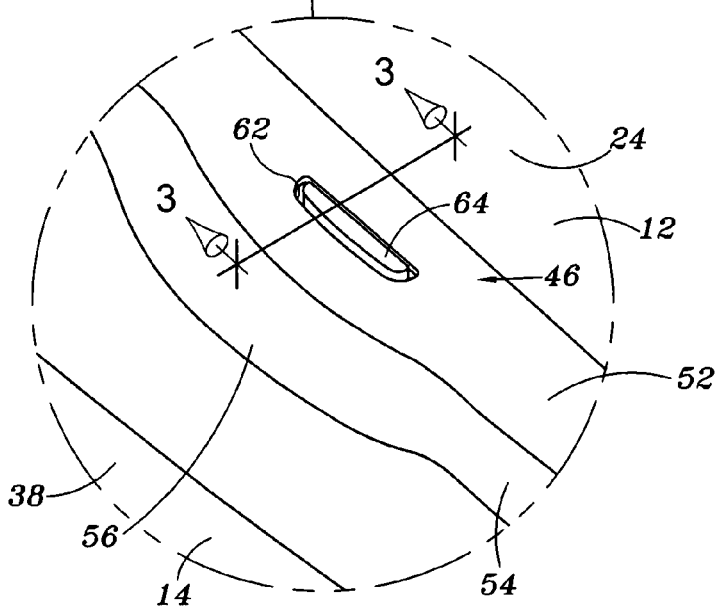
FIG. 2 is a perspective view of the latch illustrating the locating rib rim.
Figure 3A:
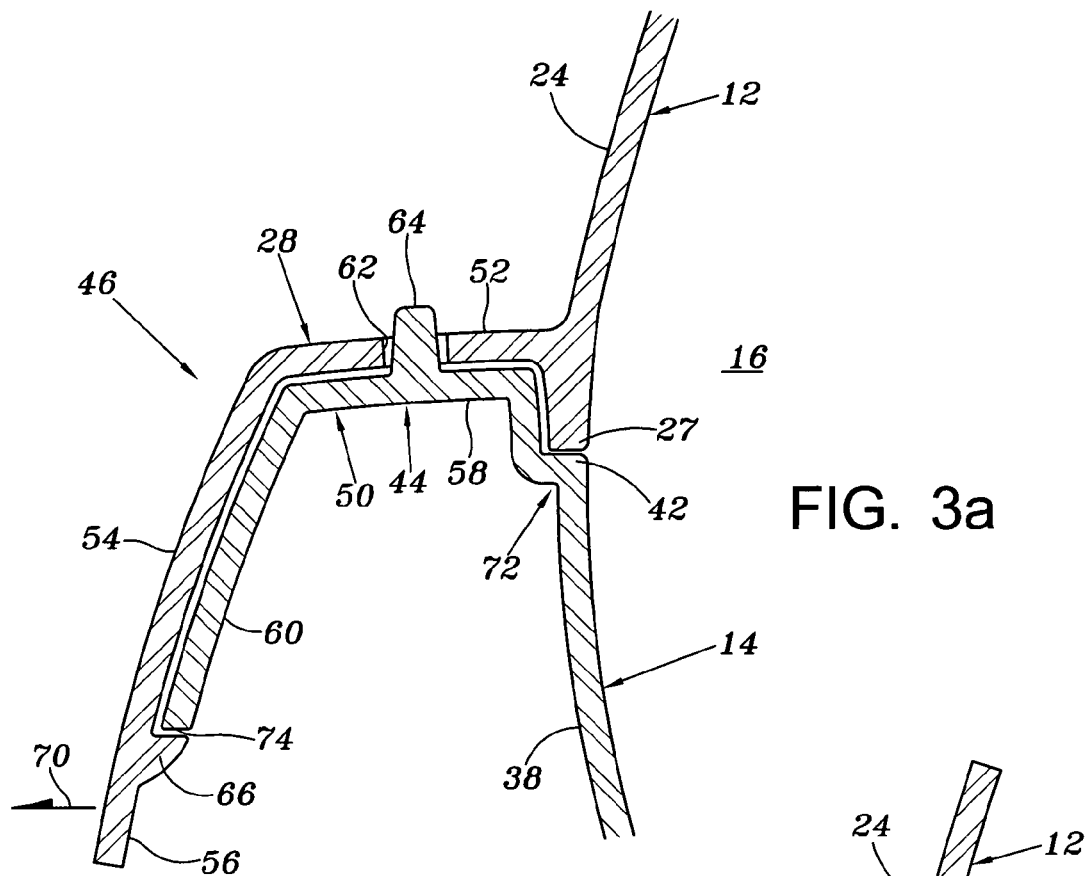
FIG. 3a is a sectional view taken generally along sectional lines 3—3 of FIG. 2 illustrating the latch in the locked position.
Figure 3B:
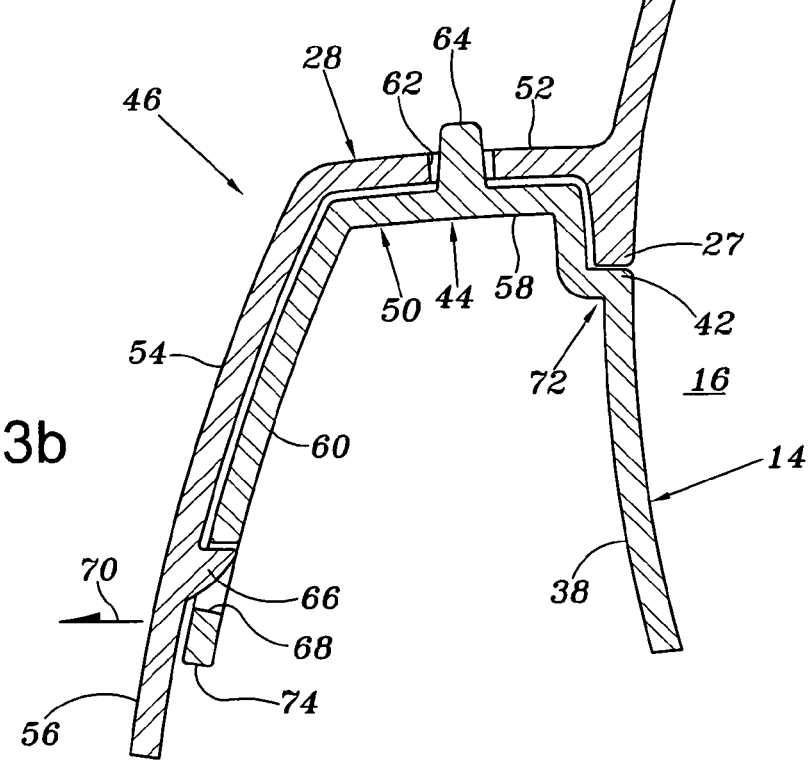
FIG. 3b is a sectional view generally taken along sectional lines 3—3 of FIG. 2 illustrating an alternate configuration of the latch in the locked position.

Latch 46, as best seen in FIGS. 2, 3a and 3b, securely fastens hood 12 to pan 14 in a locked position. Latch 46 is formed by hood rim 28 and pan rim 44 that are configured to be interlocked together. Latch 46 is preferably disposed on both sides of litter pan 10. Hood rim 28 includes a top wall 52 and a sidewall 54 extending therefrom. Sidewall 54 includes a handle portion 56 for unlocking latch 46 (discussed in further detail below). Pan rim 44 includes a top wall 58 and a sidewall 60 such that when hood 12 is mounted above pan 14, as best seen in FIGS. 3a and 3b, pan rim walls 58 and 60 support hood rim walls 52 and 54 respectively.

An aperture 62 is disposed on hood rim top wall 52 and is sized to receive a rib 64, disposed on pan rim top wall 58. Rib 64 acts as a locating pin or guide to allow the pet owner to easily align hood 12 with pan 14 when it is desired to configure litter pan 10 for use by the pet. Additionally, when hood 12 is connected to pan 14, rib 64 acts to prevent the hood and pan rims 12 and 14 from spreading apart.

Hood rim sidewall 54 includes a rib 66 protruding therefrom and is positioned to engage sidewall 60 when latch 46 is in the locked position. As seen in FIG. 3a, rib 66 is preferably positioned on handle 56 and is positioned below sidewall 60 so as to prevent hood 12 from being separated from pan 14 when litter box 10 is configured for use by the pet. In an alternate embodiment, as seen in FIG. 3b, sidewall 54 includes an aperture 68 so as to receive rib 66 to prevent separation of hood 12 from pan 14.

When it is desired to separate hood 12 from pan 14, latch 46 is unlocked by applying a force to handle 56 in the direction of arrow 70 (FIGS. 3*a* and 3*b*). This force deflects sidewall 54 to separate rib 66 from sidewall 60. While in this position, hood 12 can be lifted away from pan 14 for convenient access to interior area 16 for cleaning or if it is desired to separate hood 12 from pan 14 for storage.

When it is desired to connect hood 12 to pan 14, hood bottom opening 27 is placed in general alignment with pan upper opening 42. When aligned, hood 12 is lowered onto pan 14. During this movement, rib 66 slideably engages rim 50 causing sidewall 54 to deflect in the direction of arrow 70. As hood 14 continues to be lowered closer to pan 14, aperture 62 aligns with and receives rib 64. When rib 64 is disposed inside aperture 62, hood sidewall 24 engages a pan shoulder 72 (FIGS. 3*a* and 3*b*) and hood rim top wall 52 and sidewall 54 are supported by top wall 58 and sidewall 60 of pan 14. In addition, sidewall 54 returns to its un-deflected position which in turn causes rib 66 to engage sidewall end 74 (FIG. 3*a*), or in the alternative, causes rib 66 to be fully inserted inside a sidewall aperture 68 (FIG. 3*b*). While in this position, hood 12 is securely fastened to pan 14 in the locked position.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A latch operable between a locked position and an unlocked position for securing first and second members of an enclosure, the latch comprising:
    a rim adapted to be disposed on the first member, said rim having a top wall and first and second sidewalls, said top wall including an aperture disposed thereon and said first sidewall including a rib extending therefrom;
    a rim adapted to be disposed on the second member, said rim including a top wall and a second member sidewall, said top wall having a rib extending therefrom;
    said second member rim further including a shoulder extending from said top wall opposite said second member sidewall; and
    wherein when the latch secures the members in the locked position, said first member rim is disposed adjacent said second member rim, such that said second member rim rib is disposed in said first member rim aperture and said first member rim rib engages said second member rim sidewall and said first member second sidewall engages said second member rim shoulder to prevent separation of the first and second members.

2. The latch of claim 1 wherein said second member rim sidewall includes a first end and a second end, said first end being connected to said second member rim top wall and said second end disposed opposite said first end, wherein when the latch is in the locked position, said first member rim rib engages said second member rim sidewall second end to prevent separation of the first and second members.

3. The latch of claim 1 wherein the first member rim first sidewall is flexible.

4. The latch of claim 3 wherein when the latch is in the unlocked position, said first member rim first sidewall is deflected such that said first member rim sidewall rib is spaced apart from said second member rim sidewall such that the first member can be separated from the second member thereby removing said second member rim rib from said first member rim aperture.

5. The latch of claim 1 wherein said second member rim sidewall includes an aperture such that when the first and second members are in the locked position, said first member rim rib is disposed in said aperture to prevent separation of the first and second members.

6. The latch of claim 5 wherein when the latch is in the unlocked position, said first member rim first sidewall is deflected such that said first member rim sidewall rib is removed from said second member rim sidewall aperture such that the first member can be separated from the second member thereby removing said second member rim rib from said first member rim aperture.

7. An enclosure for a pet, the enclosure having a latch operable between a locked position and an unlocked position, the enclosure comprising:
    a first member having a top wall, a front wall, a rear wall, a pair of sidewalls, and a bottom opening opposite, said top wall, said front wall, said rear wall and said sidewalls including a rim disposed adjacent said bottom opening, said rim including a top wall and first and second sidewalls;
    a second member having a bottom wall, a front wall, a rear wall, a pair of sidewalls and an upper opening opposite said bottom wall, said front wall, rear wall and said sidewalls including a rim disposed adjacent said upper opening, said rim including a top wall and a second member sidewall;
    said second member rim further including a shoulder extending from said top wall opposite said second member sidewall;
    wherein said second member rim top wall includes a rib extending therefrom and said first member rim top wall includes an aperture for receiving said rib, said first member rim sidewall further including a rib extending therefrom to engage said second member rim first sidewall; and
    wherein when the latch is in the locked position, said second member rim is disposed adjacent said first member rim such that said second member rib is disposed in said aperture and said first member rib engages said second member rim sidewall and said first member second sidewall engages said second member rim shoulder to prevent separation of the first and second members.

8. The enclosure of claim 7 wherein said first member is a hood.

9. The enclosure of claim 8 wherein said second member is a pan.

\* \* \* \* \*